United States Patent [19]

Blackwood

[11] Patent Number: 4,504,897
[45] Date of Patent: Mar. 12, 1985

[54] HARMONIC NOISE CONTROL IN CHOPPER TYPE VOLTAGE REGULATORS

[75] Inventor: Carl I. R. Blackwood, Falls Church, Va.

[73] Assignee: White Scientific Consultants Inc., Arlington, Va.

[21] Appl. No.: 551,968

[22] Filed: Nov. 15, 1983

[51] Int. Cl.$^3$ .............................................. H02J 1/02
[52] U.S. Cl. ...................................... 363/39; 363/45; 323/224
[58] Field of Search ................................... 363/39–48, 363/124, 127–128; 323/224, 225, 268, 271–272

[56] References Cited

U.S. PATENT DOCUMENTS

| | | | |
|---|---|---|---|
| 1,873,952 | 8/1932 | Aubort | 363/45 |
| 2,008,519 | 7/1935 | Smith | 175/363 |
| 2,117,752 | 5/1938 | Wrathall | 363/170 |
| 2,236,254 | 3/1941 | Willis | 175/363 |
| 3,551,851 | 12/1970 | Engel | 363/44 X |
| 3,553,566 | 1/1971 | Nagy, Jr. | 363/45 |
| 3,564,394 | 2/1971 | Opal et al. | 307/297 |
| 3,825,814 | 7/1974 | Pelly | 363/45 |
| 4,124,241 | 2/1979 | Freilich et al. | 364/724 |
| 4,190,882 | 2/1980 | Chevalier et al. | 363/41 |
| 4,323,845 | 4/1982 | Leach | 323/224 |
| 4,358,818 | 11/1982 | Rosa | 363/46 |

FOREIGN PATENT DOCUMENTS 0811441  3/1981  U.S.S.R. ................................ 363/48

Primary Examiner—Peter S. Wong
Attorney, Agent, or Firm—Wilkinson, Mawhinney & Theibault

[57] ABSTRACT

Voltage regulators of the waveform chopping type operable with alternating current sources are operated in a mode wherein a wave train complementary to the chopping wave train is provided with the property that each of the wave trains has equal amplitude and inverse polarity harmonics. Thus the two wave trains may be added together to cancel out all the noise introduced by the chopping. This is done by synchronously switching the respective wave trains in two corresponding processing channels leading to two respective power output channels, wherein one channel has incorporated therein amplitude regulation means, preferably of the feedback type. To remove the noise components, the higher frequency harmonics are isolated from the fundamental frequency which serves as the power supply medium, and then the equal amplitude and opposite sense harmonics are added together to cancel the noise components.

9 Claims, 5 Drawing Figures

A - SUPPLY
B - SERIES SWITCH
C - SHUNT SWITCH
D - LOW PASS FILTER
E - HIGH PASS FILTER
F - LOAD
G - SWITCH CONTROLLER
H - SUMMING NETWORK

CHOPPED WAVEFORM

COMPLEMENT

A — SUPPLY
B — SERIES SWITCH
C — SHUNT SWITCH
D — LOW PASS FILTER
E — HIGH PASS FILTER
F — LOAD
G — SWITCH CONTROLLER
H — SUMMING NETWORK

HARMONIC NOISE CONTROL IN CHOPPER TYPE VOLTAGE REGULATORS

TECHNICAL FIELD

This invention relates to chopped waveform type of voltage regulators, and more particularly it relates to the removal of noise introduced by chopping the waveform.

BACKGROUND ART

A preferred type of alternating current voltage regulator known in the art chops the supply voltage waveform at a frequency substantially higher than that of the supply voltage. Such a regulator is set forth in U.S. Pat. No. 3,564,394, issued to K. E. Opal et al., on Feb. 16, 1971. However, noise generated by the chopping causes problems when such supplies are used in communication systems, control systems, computer systems and others susceptible to noises caused by discontinuities, cusps and resulting harmonics introduced by the chopping.

Another technique, as set forth in U.S. Pat. No. 2,007,519, issued to J. J. Smith, on July 16, 1935, or U.S. Pat. No. 1,873,952, issued to E. Aubort, Aug. 30, 1932, provides for the generation of specific harmonics and controlling the amplitude and phase for adding to and cancelling out those harmonics in the output of the voltage supply.

Active type filters are also known to reduce harmonics in power converter systems as set forth in U.S. Pat. No. 4,358,818, issued to J. Rosa, Nov. 9, 1982 or U.S. Pat. No. 3,825,814, issued to B. R. Pelly, July 23, 1974.

In all of these prior art techniques it is extremely difficult to match and eliminate all the spurious noises and harmonics, and the best that can be expected is to eliminate those components that provide the major noise interference problems.

It is accordingly an objective of this invention to improve the state of the art by a more thorough elimination of a range of harmonic and spurious noise signals in a chopped waveform type of power supply system.

DISCLOSURE OF THE INVENTION

In accordance with this invention it has been discovered that if two complementary wave trains are derived from the chopped waveform in a chopping type voltage regulator with alternating amplitude samples and voids in the respective wave trains so phased that the amplitude samples in one of the waveforms coincide with the voids in the other, then the two wave trains have equal and inverse harmonics of the noise components introduced by the chopping. Accordingly all the noise components may be eliminated by separating the harmonics from the fundamental chopping frequency and combining the noise components of the two wave trains.

Thus, two processing channels are provided to derive the respective wave trains with synchronized switching means connected in series in the two channels to provide the complementary wave trains. High pass filter means then separates the harmonics from the fundamental frequency in each channel to provide the two "noise" wave trains in equal amplitude and opposite phase. By simply combining the two wave trains then all the noise components are effectively removed from the system.

This noise elimination technique is incorporated in a preferred embodiment which employs a feedback type amplitude regulation circuit and a frequency regulation circuit thereby to provide a chopped waveform type of voltage regulation system devoid of noise yet stable in amplitude and reliable in the presence of frequency variations.

THE PREFERRED EMBODIMENT

Figure 1:
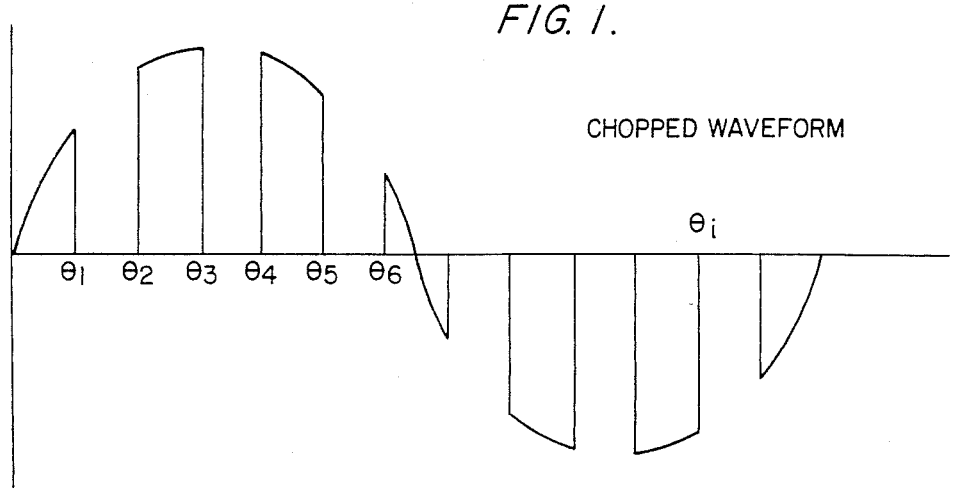
FIG. 1 is a typical chopped waveform diagram associated with a regulated power supply system.
Figure 2:
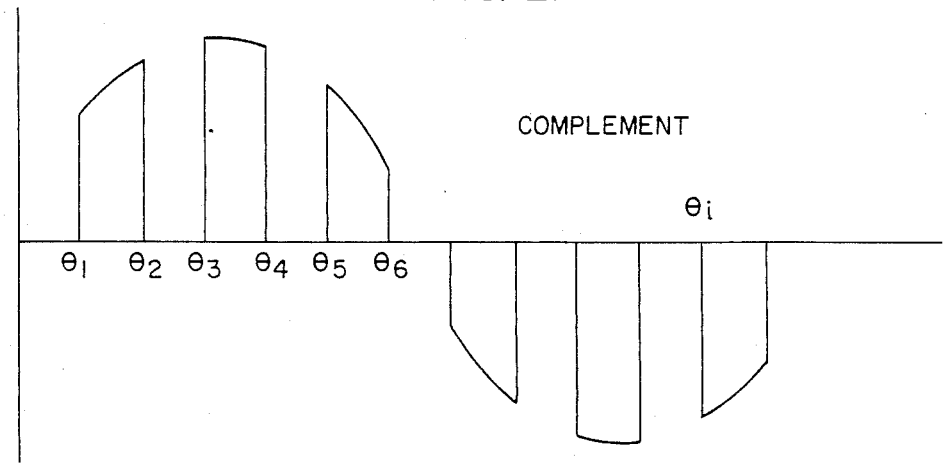
FIG. 2 is the complement waveform to that shown in FIG. 1 where the voids of one waveform coincide with the amplitude samples of the other.

The waveform as shown in FIGS. 1 and 2 can be expressed as an infinite series:

$$f(t) = a_o + \sum_{n=1}^{\infty} a_n \cos n w_o t + \sum_{n=1}^{\infty} b_n \sin n w_o t$$

where $$a_o = \frac{1}{T} \int_{t}^{t+T} f(t) \, dt$$

$$a_n = \frac{2}{T} \int_{t}^{t+T} f(t) \cos n w_o t \, dt$$

$$b_n = \frac{2}{T} \int_{t}^{t+T} f(t) \sin n w_o t \, dt$$

Considering the odd-functioned wave forms demonstrated in the Figures, the "$a_n$" coefficients to not exist and "$b_n$" becomes equal to $$b_n = \frac{1}{\pi} \int_{o}^{2\pi} f(t) \sin n\theta \, d\theta$$

where for FIG. 1

$$f(t) = \begin{cases} \sin \theta & \text{for } 0 \leq \theta < \theta_1 \\ 0 & \text{for } \theta_1 \leq \theta < \theta_2 \\ \sin \theta & \text{for } \theta_2 \leq \theta < \theta_3 \\ 0 & \text{for } \theta_3 \leq \theta < \theta_4 \ldots \text{ and so on} \end{cases}$$

and for FIG. 2

$$f(t) = \begin{cases} 0 & \text{for } 0 \leq \theta < \theta_1 \\ \sin \theta & \text{for } \theta_1 \leq \theta < \theta_2 \\ 0 & \text{for } \theta_2 \leq \theta < \theta_3 \\ \sin \theta & \text{for } \theta_3 \leq \theta < \theta_4 \ldots \text{ and so on} \end{cases}$$

The indefinite form of the foregoing integral has the solution $$\frac{1}{2\pi}(\theta - \tfrac{1}{2}\sin 2\theta) + K_1 \text{ for } n = 1$$

$$\frac{1}{\pi(n^2 - 1)}\{\cos\theta \sin n\theta - n \sin\theta \cos n\theta\} + K_2$$
$$\text{for } n > 1$$

Figure 3:
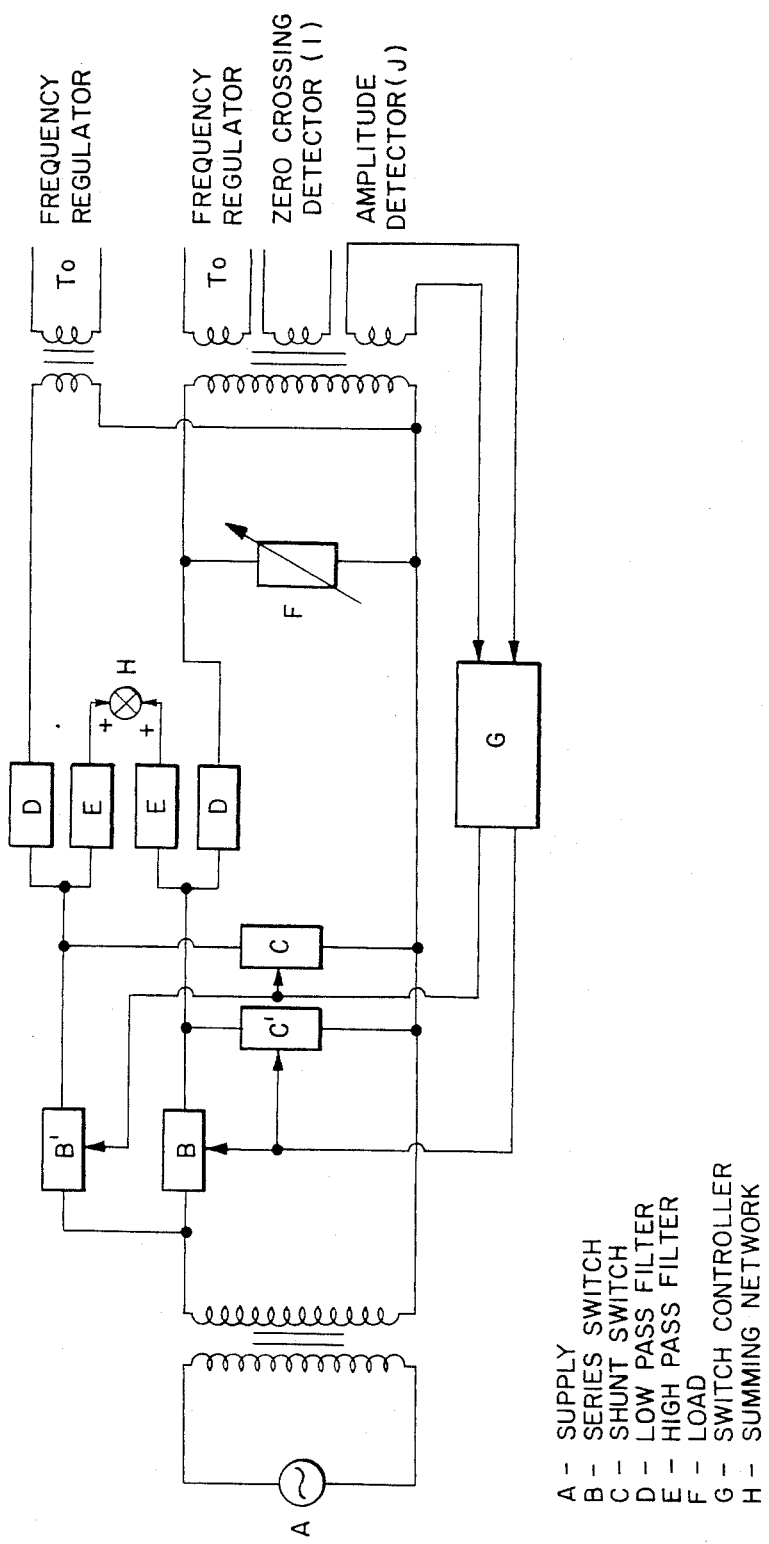
FIG. 3 is a block system diagram of a voltage regulator system embodying the invention.

Substituting the respective limits of integration for both the first chopped waveform and its complementary dual into these solutions, demonstrates that both waveforms possess equal amplitude inverse harmonic trains outside their respective fundamental components. Tables 1 and 2 show the results of computer simulations which confirm this result; and they further demonstrate the effect of ON:OFF ratio on the amplitude of the fundamental, and the separation in frequency space between the fundamental and the energized harmonics as a function of switching rate. It is this fact which is utilized in this invention which regulates voltage using the within-cycle switching methodology; while eliminating the otherwise detrimental consequences of such regulation by employing the inverse phase properties inherent in the chopped waveform and its dual. The block schematic of FIG. 3 shows how this is achieved.

TABLE 1

Within-Cycle Assymmetrical Switching With 4 Switch Positions

There are 7 cycle divisions and ON:OFF is in the ratio of 4:1. The switch-on points are at the following degree positions within the cycle:

0.00    67.50    157.50    247.50    337.50

The switch-off points are at the following degree positions within the cycle:

49.50    139.50    229.50    319.50    360.00

Below is a tabulation of the normalized harmonic amplitudes of the "switched-on" portion of the chopped sinusoid which has unity amplitude:

| (1) | .8000000 | (2) | −.0000000 | (3) | −.1099735 | (4) | .0000000 |
|---|---|---|---|---|---|---|---|
| (5) | .1099735 | (6) | −.0000000 | (7) | −.0467742 | (8) | .0000000 |
| (9) | .0467743 | (10) | .0000000 | (11) | .0959712 | (12) | −.0000001 |
| (13) | −.0959713 | (14) | .0000000 | (15) | −.0378414 | (16) | .0000001 |
| (17) | .0378414 | (18) | −.0000000 | (19) | −.0000000 | (20) | −.0000000 |
| (21) | −.0000000 | (22) | −.0000000 | (23) | −.0252275 | (24) | .0000000 |
| (25) | .0252275 | | | | | | |

Below is a tabulation of the normalized harmonic amplitudes of the "switched-off" portion of the chopped unity amplitude sinusoidal waveform:

| (1) | .2000000 | (2) | .0000000 | (3) | .1099735 | (4) | −.0000000 |
|---|---|---|---|---|---|---|---|
| (5) | −.1099735 | (6) | .0000000 | (7) | .0467742 | (8) | −.0000000 |
| (9) | −.0467743 | (10) | −.0000000 | (11) | −.0959712 | (12) | .0000001 |
| (13) | .0959713 | (14) | −.0000000 | (15) | .0378414 | (16) | −.0000001 |
| (17) | −.0378414 | (18) | .0000000 | (19) | .0000000 | (20) | .0000000 |
| (21) | .0000000 | (22) | .0000000 | (23) | .0252275 | (24) | −.0000001 |
| (25) | −.0252275 | | | | | | |

TABLE 2

Within-Cycle Assymmetrical Switching With 7 Switch Positions

There are 14 cycle divisions and ON:OFF is in the ratio of 3:1. The switch-on points are at the following degree positions within the cycle:

0.00    45.00    96.43    147.86    199.29
250.71    302.14    353.57

The switch-off points are at the following degree positions within the cycle:

32.14    83.57    135.00    186.43    237.86
289.29    340.71    360.00

Below is a tabulation of the normalized harmonic amplitudes of the "switched-on" portion of the chopped sinusoid which has unity amplitude:

| (1) | .7500000 | (2) | −.0000000 | (3) | −.0000000 | (4) | −.0000000 |
|---|---|---|---|---|---|---|---|
| (5) | −.0000000 | (6) | −.0000002 | (7) | −.0000000 | (8) | .0000002 |
| (9) | −.0000000 | (10) | −.0000000 | (11) | −.0000000 | (12) | −.0000001 |
| (13) | −.1591549 | (14) | .0000002 | (15) | .1591550 | | |

Below is a tabulation of the normalized harmonic amplitudes of the "switched-off" portion of the chopped unity amplitude sinusoidal waveform:

| (1) | .2500000 | (2) | .0000000 | (3) | .0000000 | (4) | .0000000 |
|---|---|---|---|---|---|---|---|
| (5) | .0000000 | (6) | .0000002 | (7) | .0000000 | (8) | −.0000002 |
| (9) | .0000000 | (10) | .0000000 | (11) | .0000000 | (12) | .0000001 |
| (13) | .1591549 | (14) | −.0000002 | (15) | −.1591550 | | |

The object of the invention is to provide a line voltage regulator of the within-cycle switching type, which will perform reliably and efficiently irrespective of variations in the supply frequency; and which will eliminate the attendant harmonic noise set up by the switching action, thereby substantially reducing any harmonic interference on the power source.

The input alternating current (a.c.) voltage, "A" in FIG. 3, is accessed through an input transformer, and first encounters either of the series switches, B or B'. The system is so arranged that switches B and B' operate alternately: that is, when B is turned on, B' is turned off; and when B is turned off, B' is turned on. Then, there are the corresponding shunt switches C and C', wherein the ON/OFF actions of switch C are synchronized with those actions of switch B; and the corresponding ON/OFF actions of switch C' are synchronized with those of switch B'. The chopped outputs from both the B-C' switch combination and the B'-C switch combination are separately fed to parallel combinations of high-pass/low-pass filters for the separation of their respective fundamental and harmonic components. In FIG. 3, D represents a low-pass filter and E represents a high-pass filter. The outputs from both high-pass filters are summed at H, whereby the harmonic noise created by the within-cycle switching action is removed; and the consequent probability of harmonic interference on the power source is substantially reduced. The screened fundamental from the first chopped waveform then flows on to the load, F; and the fundamental from the complementary dual forms a second (unregulated amplitude) voltage source which is fed to a circuit for producing a regulated frequency supply. The voltage delivered to the load, F, is tightly regulated in amplitude by the monitoring systems at I and J, and by the feedback switch controller, G. Systems I and J are a zero crossing detector and an amplitude detector, respectively, and are designed (as is G) in accordance with the technique, shown in U.S. Pat. No. 3,564,394 of Opal et al. The patent of Opal et al. is hereby incorporated by reference.

Figure 4:
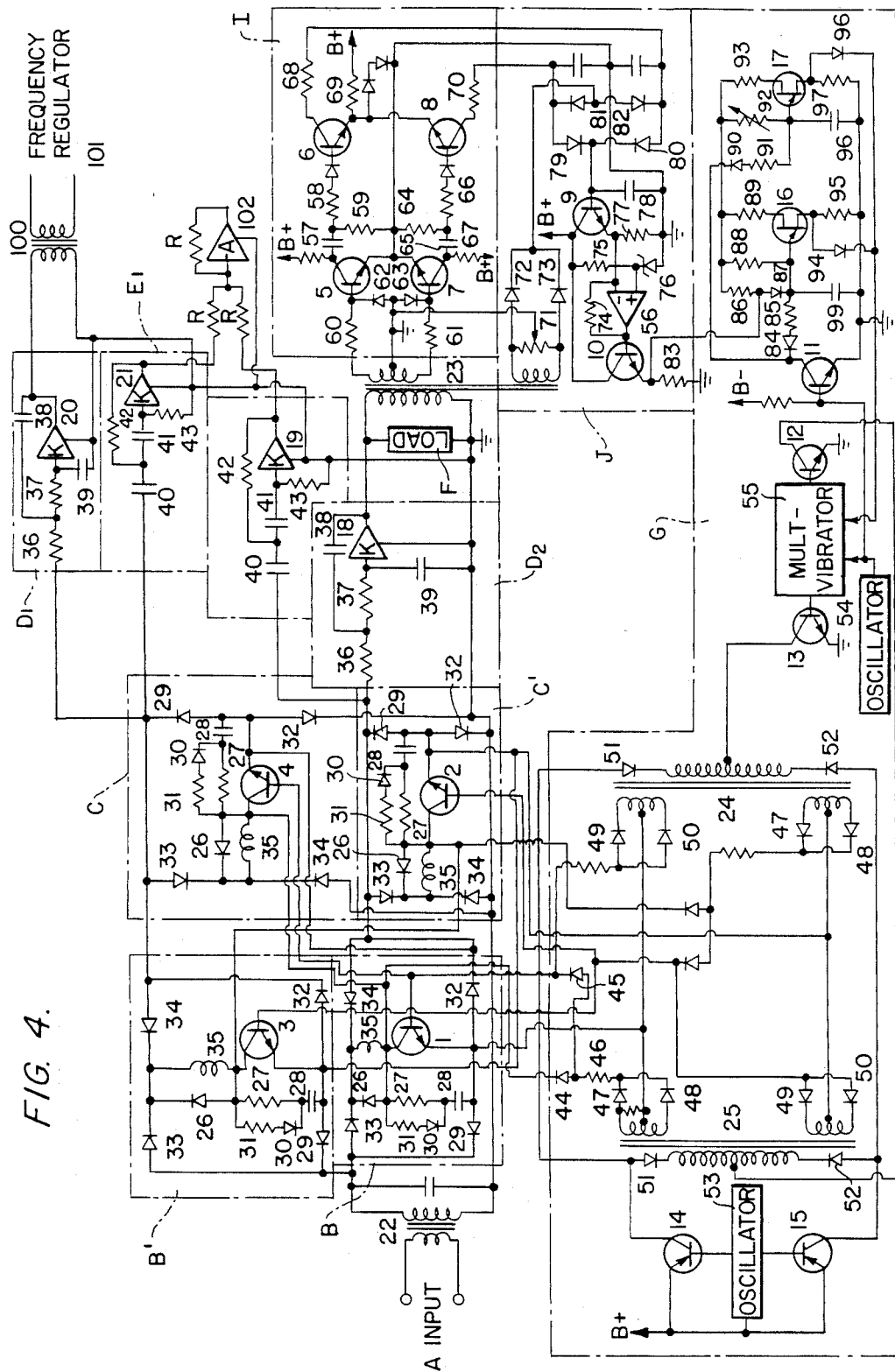
FIG. 4 is a schematic circuit diagram of the system of FIG. 3 cross referenced thereto by identification of the blocks with similar reference characters.

Referring to FIG. 4, it is seen that the switches B, B', C and C' have essentially the same electronic configuration; and, accordingly, the corresponding components in each of these four switches have been given the same numerical designation. The actual ON/OFF switching is carried out by the power transistors 1, 2, 3 and 4 which are in turn operated by the bias experienced at their respective bases. Assuming that switch B is gated ON at a given instant (which implies that C is ON, and that B' and C' are OFF) then, if the applied input voltage is in the positive going half-cycle, current will flow through diode 33, inductor 35, power transistor 1 and diode 32 on through filters D and E to the load F. If the applied voltage were in a negative going half-cycle, the current flow would have been via diode 29, power transistor 1, inductor 35 and diode 34. Inductor 35 proscribes the rate at which the current through power transistor 1 increases; and diode 26 is a "free-wheeling" diode. This means that the tendency of the input end of inductor 35 to go negative, as a consequence of the inductor current's inability to change instantaneously, will be halted when diode 26 latches on and starts conducting with its cathode one diode voltage drop below the collector of power transistor 1 (Pressman, 1977). In shunt with power transistor 1 are resistor 27 and capacitor 28 in series; and in shunt with resistor 27 is the series combination of resistor 31 and diode 30. The rapid interruption of the current through inductor 35 generates voltage spikes across the switching power transistor. These are damped out by making the C-R time constant of resistor 27 and capacitor 28 greater than the period of these voltage spikes; and the capacitor across the secondary of the input transformer 22 provides an equivalent damping function with respect to similar spikes caused by the interruption of the current through the transformer secondary. Diode 30 prevents capacitor 28 from discharging through charging resistor 31, while resistor 27 regulates the discharge of capacitor 28 in some manner consistent with the switching frequency (Pressman, 1977, Opal et al, U.S. Pat. No. 3,564,394).

The switched waveform then flows to the parallel combination of the RC active low-pass (D) and high-pass (E) filters of the Sallen and Key design (Martin et al, 1973) at which point the switching harmonics are removed through phase cancellation by the summing network H. The given realization of networks D, E and H lends itself well to integrated circuit technology, besides which, the second order response characteristics of the Sallen and Key networks are closer to the idealized filter characteristics than their equivalent LCR counterparts. In the summing network, H, the input resistors and the feedback resistor must all have the same value to effect an unweighted sum of the input voltage: another requirement is that the gain of the operational amplifier 102 be much greater than unity.

The shunt switches (C and C') act as clamps, and serve to prevent the voltage across their respective series switches from rising above the secondary voltage of the input transformer when the series switches are turned off. As indicated earlier, shunt switch C' is associated with series switch B, and shunt switch C is associated with series switch B'. When C' is ON, B is OFF and vice versa; and when C is ON, B' is OFF and vice versa. B' and C' are strapped together and turn ON and OFF simultaneously; and B and C are similarly turned ON and OFF simultaneously. However, when switches B' and C' are ON, then switches B and C are OFF and vice versa.

Regulation of the alternating current voltage amplitude at the load, F, is achieved first by generating a continually updated direct current signal which is proportional to the output amplitude of the alternating current voltage across the load, F. This direct current signal is then used in conjunction with a constant reference direct current source to produce a "discrepancy" signal which is used to adjust the ON/OFF switching times of the within-cycle switching circuits.

The load voltage at F is fed through transformer 23 to the zero-crossing detector (I) and the amplitude detector (J). The terminals of the first secondary supply to the zero-crossing detector are connected to the bases of transistors 5 and 7 through resistors 60 and 61, respectively. The bases of these two transistors are also connected to ground through diodes 62 and 63. The outputs of transistors 5 and 7 are differentiated (via capacitor 57-resistor 59 and capacitor 65-resistor 64) and then applied through separate resistor-diode series combinations to the bases of transistors 6 and 8, respectively. The input to the zero-crossing detector from the secondary of transformer 23, alternately turns transistors 5 and 7 ON and OFF in accordance with the frequency of the alternating current voltage across F. The switching times of transistors 5 and 7 are coincident with consecutive zero-crossings of the applied alternating waveform; and the differentiated outputs of transistors 5 and 7 would reflect a series of Dirac type impulses in response to the input Heaviside ON/OFF step function. Thus, the OFF-ON transition in transistor 5 would produce a positive going spike at its differentiated output, while a negative going spike would simultaneously occur at the differentiated output of transistor 7. Similarly, the ON-OFF transition at transistor 5 would produce a negative going spike at its differentiated output, while a positive going spike would be simultaneously produced at the differentiated output of transistor 7. However, the diodes in series with resistors 58 and 66 ensure the removal of the negative spikes from the outputs of both differentiators; and the remaining positive spikes, which must now be 180 degrees out of phase in the two outputs, are used to alternately turn on transistors 6 and 8.

The reason for incorporating an alternating impulsive switch mechanism of this type (as exemplified by the switching behavior of transistors 6 and 8) is to provide instantaneous capacitive discharge capabilities, at each zero-crossing of the monitored load voltage, for capacitors in the amplitude detector circuit. It is observed in the amplitude detector circuit, for example, that diodes 81 and 82 charge separate capacitors on overlapping cycles of the monitored load voltage. Charging is done via the second secondary input and diodes 72 and 73. Diode 81 charges its associated capacitor to a voltage proportional to the output amplitude of the load voltage over a given cycle, after which time this capacitor is discharged through transistor 6, which would have been triggered by a positive going pulse. The peak voltage during this charging process appears at the base of transistor 9. Halfway through the charging of this capacitor, however, a new charging cycle is initiated in the capacitor associated with the diode 82. This capacitor is charged for a full cycle and then discharged through transistor 8 after it has been triggered by a positive going pulse half a cycle behind the discharging of the first capacitor. Again, the peak voltage during the charging of this second capacitor appears at the base of transistor 9, and reflects a voltage proportional to the output amplitude over its cycle. Thus, every half cycle, changes in the amplitude of the load voltage are reflected in the changes occurring in the voltage appearing across the base of transistor 9. Consequently, the voltage at the emitter of transistor 9 is proportional to the amplitude of the alternating current load voltage, and is applied to one input of the differential amplifier 56. The other input to the differential amplifier is a reference voltage supplied through the zener diode 76. The discrepancy between both input signals will produce an output error signal which is then applied to the base of transistor 10. The emitter of transistor 10 is connected to the switch controller (G) as shown.

The arrangement and operation of the switch controller circuit, G, and its dependence upon and interaction with the output error signal as provided to the switch controller circuit from the emitter of transistor 10, are as outlined in the patent of Opal et al and the ancillary references cited in that patent application. Basically, the oscillator 54 determines the within-cycle switching rate and the ON:OFF switching ratio is regulated by the magnitude of the output error signal from transistor 10.

Figure 5:
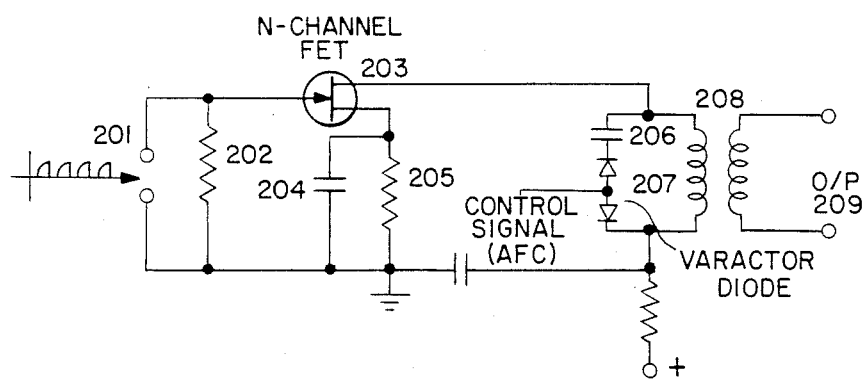
FIG. 5 is a circuit diagram of a typical frequency regulation circuit employed by the invention.

These circuits illustrate the fundamental premises of this invention, namely that complementary chopper waveforms processed in their respective channels and added together to remove the harmonic distortion provides a method by which switching noises may be cancelled out. The frequency regulator embodiment of FIG. 5 is for higher frequency power supplies, such as 400 Hertz, and therefore employs a resonant control circuit. Thus, the frequency of the delivered output signal depends upon the stability of the capacitor 206 and the transformer inductance 208. Accordingly the varactor diode 207 and automatic frequency control signal may be employed as an additional guarantee against any frequency drift in the frequency of the output supply provided at the output terminals 209.

It is to be noted that by employment of the complementary waveform processing channel, an unregulated source of power is available at the topmost transformer winding of FIG. 3. This may serve as the source of power for driving the frequency regulator circuit and the like.

The state of the art is improved by this invention by affording a highly reliable and efficient power supply system operating in a different mode from the prior art to effectively cancel out a wide range of noise introduced in chopped waveform type of voltage regulators. Therefore those patentable features believed descriptive of the spirit and nature of the invention are defined with particularity in the following claims.

What is claimed:

1. The method of obtaining harmonic free alternating current voltage regulation in a regulator of the waveform chopping type and reliable operation in the presence of supply frequency variations, comprising the steps of:
    chopping the alternating current waveform to be regulated at a frequency producing a plurality of chops within each cycle of the alternating current waveform,
    deriving from the chopped waveform two complementary wave trains with respective alternate amplitude samples and voids so phased that the voids in one of the complementary wave trains coincide with the amplitude samples in the other, and thereby having the characteristics that each wave train has equal amplitude and inverse harmonics of the noise components introduced by the chopping,
    processing the two complementary wave trains in two separate channels,
    passing the fundamental frequency in each channel through a separate low-pass filter,
    passing the harmonic frequencies in each channel through a separate high-pass filter and summing the two results to thereby cancel the equal amplitude and inverse harmonics,
    operating a load with the fundamental from one said channel, and
    amplitude regulating the voltage delivered to the load by feedback controlled amplitude regulation means.

2. The method of regulating alternating current sources in a voltage regulator of the waveform chopping type, comprising the steps of:
    deriving from the chopped waveform two complementary wave trains with respective alternate amplitude samples and voids so phased that the voids in one of the complementary wave trains coincide with the amplitude samples in the other and thereby having the property that each wave train has equal amplitude and inverse harmonics of the noise components introduced by the chopping, and
    eliminating the harmonic noise components by filtering out and combining the noise components in such phase to cancel said inverse harmonics.

3. A voltage regulator of the waveform chopping type, comprising in combination:
    means for chopping an alternating current waveform at a frequency substantially greater than that of the waveform being chopped and providing thereby two complementary wave trains with respective alternate amplitude samples and voids so phased that the voids in one of the complementary wave trains coincide with the amplitude samples in the other and thereby having the property that each wave train has equal amplitude and inverse polarity harmonics of the noise components introduced by the chopping, means for processing each of the wave trains in separate processing channels, filter means in each channel for separating from the fundamental of said frequency the harmonics introduced as noise by the chopping, and means for eliminating the harmonic noise components by combining the filtered harmonics in such phase to cancel said equal amplitude and inverse polarity components.

4. A voltage regulator as defined in claim 3 including means for amplitude regulating the fundamental frequency from the amplitude regulated channel.

5. A voltage regulator as defined in claim 4 including means for frequency regulating the fundamental frequency from the amplitude regulated channel.

6. A voltage regulator as defined in claim 5 including means for deriving a non-amplitude regulated output voltage from the other one of said channels.

7. A voltage regulator as defined in claim 3 wherein the chopping means comprises independent but synchronized switches series connected in each of said channels and further independent but synchronized shunt connected switches connected across each channel.

8. A voltage regulator as defined in claim 3 including a load device fed by one said channel and feedback type amplitude regulation means connected to maintain a constant load voltage.

9. The method of eliminating harmonics in a chopped waveform type of power supply system to preclude the possibility of their return into the system comprising the steps of chopping the waveform to provide two waveform components having equal amplitude inverse harmonic trains outside their respective fundamental components, and combining the harmonic trains to cancel the harmonic trains thereby eliminating the harmonics from the power supply system.

* * * * *